Aug. 31, 1943.  W. O. SNELLING  2,328,506
HEATER
Filed May 21, 1942

INVENTOR
Walter O. Snelling
BY
Snelling and Snelling
ATTORNEYS

Patented Aug. 31, 1943

2,328,506

UNITED STATES PATENT OFFICE 2,328,506

HEATER

Walter O. Snelling, Allentown, Pa.

Application May 21, 1942, Serial No. 443,987

1 Claim. (Cl. 219—39)

This invention relates to a combined gas and electric heater adapted to give a very hot flame. More particularly the invention relates to a heater in which an electric heating element may be used to preheat a non-detonating gas mixture under such conditions that the gaseous mixture passing over the electric heating element and the sweeping of the stream of gas over the heating element as the gas burns, increases the rate of transfer of heat from the said element and increases the temperature of the flame while reducing the tendency of the electric heating unit to become overheated and to "burn out."

The invention comprises the combination of a gas burner with a grid to prevent striking back of the flame to a position below the grid and an electric heating element disposed immediately above or within the grid.

With such a combination heater, it is possible to obtain with a mixture of air and ordinary city gas a temperature above that which is possible with either a gas or electrical resistance heater alone.

Figure 1:
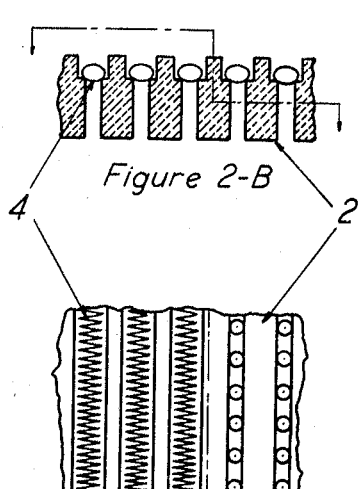
Figure 1:
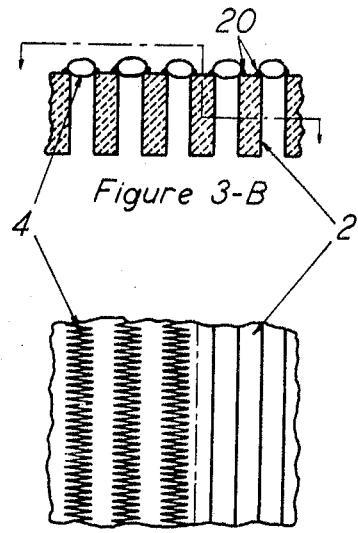
Figure 1:
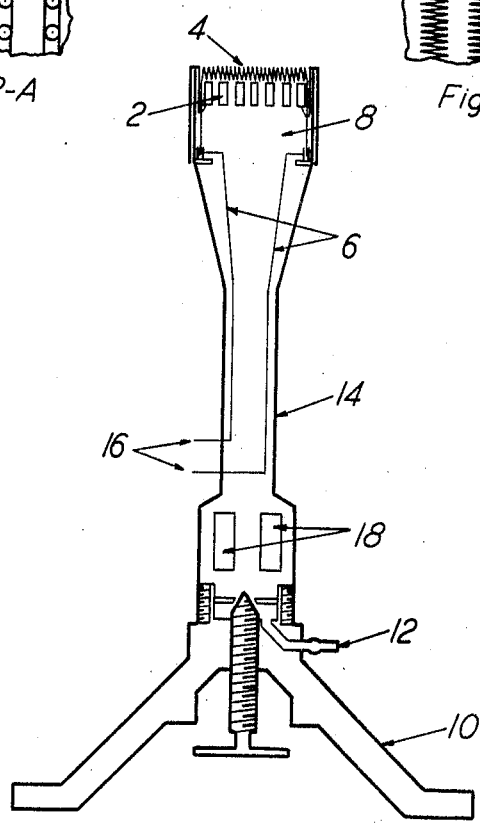

In the drawing—Fig. 1 is a vertical view, in part diagrammatic and in part sectional, of an embodiment of the heater of the present invention.

Figs. 2B and 3B are sectional views of two examples of grid and heating element arrangements which may be used in this invention, and Figs. 2A and 3A are detailed plan views of these sections.

There is shown a heater comprising a grid 2, such as that of the common Meker laboratory burner, adapted to prevent the striking back of a gas flame and also electric heating element 4 with lead-in wires 6.

The grid may be made of metal but is preferably constructed of some heat resistant, non-metallic material that combines low electrical conductivity with high thermal conductivity, as for example porcelain, mullite, fused silica, or borosilicate glass of high silica content, to avoid danger of short circuiting of the heating element.

The heating element may be of conventional type such as iron-chromium-nickel alloy wire coils preferably closely spaced in the heater as shown in Figures 2A, 2B, 3A, and 3B and is attached in any convenient manner to the electrically insulated current lead-in wires 6. In the grid and heating element arrangement shown in Fig. 3B, the heating element is attached to the grid by a small amount of cement at or near the points of contact 20 of the grid and the heating element.

The combination heater is provided with a suitable base of substantially larger diameter than either the heating element or the mixing chamber 8. Thus base 10 is suitably of the usual Bunsen burner size and type and is provided with gas connection 12. The diameter of the heating element is preferably less than half the diameter of the base, and the height of the heater is greater than the diameter of the base.

It will be observed that the chamber 8, is attached to the tubular element 14, which at its upper end supports the said chamber and at its lower end is secured detachably to the base.

It will be observed also that the insulated lead-in wires for the electric current extend through this tube and leave the burner through exits 16 which may be of any conventional type. Either alternating or direct current regulated if desired by means of any suitable type of transformer or rheostat, is supplied to the heating coil through these wires. The gas to be burned, entering inlet 12, passes upwardly through the tube 14, suitably after mixing with an oxygen containing gas such as oxygen or air admitted through ports 18. As the gas mixture rises through the tube and around the lead-in wires, it cools the insulated lead-in wires and avoids injury to them even when the flame above the grid is extremely hot.

The gas flame and electrical heating are preferably used simultaneously when the heater is in operation. The electric heating element preheats the gaseous mixture as it passes over the element. The gaseous mixture, moving in turn over the heated wires of the resistance heating element, increases the transfer of heat from those wires to the moving gas stream to a rate above that which would otherwise be obtained. It has been found in practice that the temperature of the electrical resistance wires in the combination gas and electric heater, contrary to expectation, is below the temperature to which the wires are heated by electricity alone when the gas flame is not present, and as a result of this, the tendency of the resistance wires to become over-heated and to "burn out" is diminished.

In explanation of this result, it is to be noted that the gas mixture burned is normally non-detonating, and appreciable time elapses from the moment of preheating of the gas mixture in the electrical heating element until the maximum combustion of the mixture occurs and thus the maximum temperature of the flame is developed at a level some distance above the heating element, this acting as a source of protection to the heating element.

For some purposes, the heater described may be used for warming a stream of air or other non-combustible gas without the use of a flame. In such a case, the stream of non-combustible gas to be heated is introduced under moderate pressure through inlet 12 and passed up around the lead-in wires, in such a manner as to keep them cool, and over the heating element 4, the grid 2 in such case being a satisfactory support for the resistance element 4. When air or other non-combustible gas is so used, the ports 10 in the heater are preferably closed.

A stream of air or other non-combustible gas so heated is useful in the laboratory, for example, for effecting evaporation or local heating. Furthermore, an adapter or reducer of conventional kind may be fitted over the top of the heating unit and a tube connected to the small end of the adapter for passing hot air or other non-combustible gas through wet glass tubing, pipettes, or the like, in order to dry them, or for other uses in chemical work.

Also the stream of either combustible or non-combustible gas may be omitted and the electrical heating element may be used alone as a substitute for a Bunsen burner. The narrow heating element and surrounding parts supported upon a relatively broad base adapt the heater particularly for direct substitution for the usual laboratory gas burner where a source of mild heat is desired. There is given highly localized heating with an abundant circulation or air directly around and up over the sides of the narrow heating element.

It will be evident that many modifications may be made, without departing from the features of my invention as herein described, and accordingly no limitations should be placed upon my invention except such as are indicated in the appended claim.

What I claim is:

A heater of the general shape of a Bunsen burner comprising an exposed electric heating element, a base, and a tubular connecting member secured at its lower end to the base, and at its upper end supporting the heating element, the distance between the base and the exposed portion of the heating element being greater than the diameter of the base and being more than three times the diameter of the electric heating element.

WALTER O. SNELLING.